Figure 1:
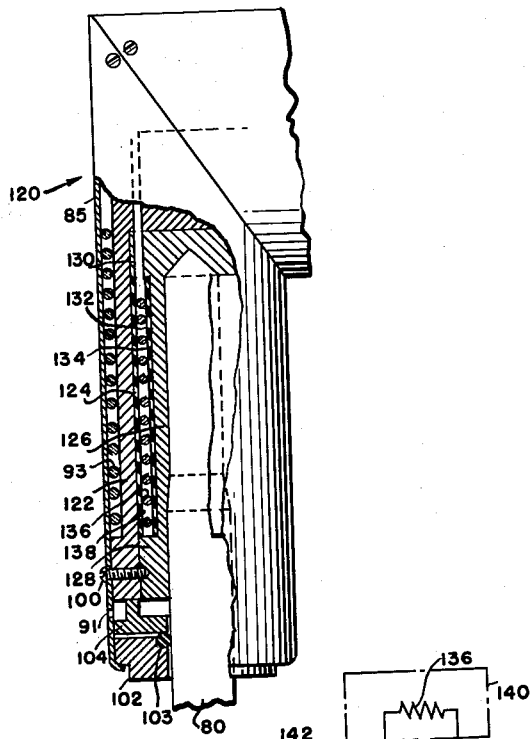

July 25, 1961     J. S. HOWELL     2,993,363
TESTING DEVICE
Original Filed May 19, 1954

INVENTOR
John S. Howell
BY Cushman, Darby & Cushman
ATTORNEYS

United States Patent Office 2,993,363
Patented July 25, 1961

2,993,363
TESTING DEVICE
John S. Howell, Fort Worth, Tex., assignor to Howell Instruments, Inc., a corporation of Texas
Original application May 19, 1954, Ser. No. 430,857, now Patent No. 2,854,844, dated Oct. 7, 1958. Divided and this application Aug. 6, 1958, Ser. No. 790,313
1 Claim. (Cl. 73—1)

The present invention relates to devices for testing heat condition responsive units and more particularly to devices for testing heat sensing units to determine if such units are operating within specified temperature ranges.

This application is a division of my copending application Serial No. 430,857, filed May 19, 1954, now Patent 2,854,844.

The accuracy of heat sensing or temperature indicating units is of vital importance to the proper functioning and safety of a modern aircraft and its power plant, such units being located in strategic portions of the aircraft to permit a determination that the more important operating temperatures of the aircraft and its component parts are within optimum or permissible limits.

There are two common forms of aircraft heat sensing units, which will be described herein, for which the present invention is particularly adapted although it is to be understood that the invention is not limited in its use to but these two forms. One common form of heat sensing unit employed in aircraft is the thermoswitch or fire detector which embodies a pair of dissimilar metals having different coefficients of thermal expansion. As is well known, the dissimilar metals, on being subjected to heat, tend to expand at different rates to thereby either open or close an electrical circuit after a certain amount of expansion of the metals has occurred. The thermoswitch or fire detector may be readily calibrated to open or close its associated electrical circuit at a specified temperature, or within a certain temperature range, the temperature or temperature range being directly related to a predetermined amount of expansion of the pair of dissimilar metals. In service, a thermoswitch may be mounted on the firewall of an aircraft engine nacelle and connected in the circuit of the fire detection system of the aircraft. If the temperature at which the firewall thermoswitch is calibrated to operate is reached, the thermoswitch actuates its electrical circuit, in this case the fire detection system circuit, and the pilot is alerted by visual or audible means, such as a warning light or buzzer located in the pilot's compartment, that the normal operating temperature has been exceeded in the vicinity of the firewall.

The other common form of aircraft heat sensing unit for which the present invention is particularly adapted is the thermocouple type unit. This unit, like the thermoswitch, may also actuate an electrical circuit at a specified temperature or within a certain temperature range, but ordinarily its function is to continuously sense the actual temperature of that portion of the aircraft in which it is located. A thermocouple heat sensing unit comprises a pair of dissimilar metallic wires, such as a chromel-alumel combination, with the ends of one wire being joined to the ends of the other wire to form a pair of junctions. One of these junctions is usually referred to as the "hot" junction, being located at that point where the temperature is to be measured, and the other junction, usually termed the "cold" junction, being located at or wired to the terminals of apparatus for measuring electrical current, such as a millivoltmeter located in the pilot's compartment.

As is well known, the application of heat to the hot junction of the thermocouple heat sensing unit causes an electromotive force to be generated in the thermocouple circuit. This electromotive force can be measured and indicated in electrical units at the cold junction of the thermocouple unit by means of the millivoltmeter, however, since the generated electromotive force is proportional to the temperature differential between the hot and cold junctions of the thermocouple, the millivoltmeter is usually not calibrated to indicate the flow of this electromotive force, but rather is calibrated to indicate directly the temperature of the hot junction in temperature units, such as degrees centigrade or Fahrenheit.

For an illustrative example of a use of the thermocouple type of heat sensing unit, reference is made to an aircraft having jet reaction propulsion units. In aircraft of this type, a fairly precise and continuous determination of the jet cone or tail pipe temperature is required in order that the pilot be apprised of a faulty propulsion unit, and a conventional method commonly employed to determine this temperature utilizes for each jet reaction propulsion unit a plurality, usually four, of the thermocouple type heat sensing units. These thermocouple units are located on the propulsion units approximately equally spaced about the inner periphery of the tail pipes thereof, and are usually connected in parallel circuitry by appropriate wiring, this parallel circuit in turn being connected to the millivoltmeter in the pilot's compartment whereby the resultant reading of the four thermocouple units may be noted by the pilot.

It has been found that heat sensing units such as the thermoswitches and thermocouple units described above frequently tend to lose their accuracy over a period of time and may operate at temperatures other than those temperatures for which they have been designed. For this reason, periodic inspections of the installed units are necessary to locate malfunctioning units. In addition, checks and inspections after installation, that is, environmental inspections, are desirable for the reason that the particular location or position of the installed unit sometimes alters the operating characteristics of the unit to an extent not predictable before installation. The inspection of thermoswitches after installation in the aircraft is desirable for still another reason. For example, it is conventional practice to employ a plurality of these thermoswitches in the aircraft fire detection system, distributing them at those critical locations where fire would usually occur. Each thermoswitch is calibrated to operate at the temperature determined to be dangerous for its particular location. The various thermoswitches used in the aircraft's fire detection system are normally supplied by one manufacturer, and although the thermoswitches may be calibrated to operate at different temperatures, there is usually close similarity in the size and configuration of the various thermoswitches. Thus there may be a bank of thermoswitches designed for operation at 750° C., another bank designed to operate at 400° C., and still another bank designed to operate at 200° C. These several similar appearing thermoswitches are usually connected in a parallel electrical circuit to a single indicator, such as a warning light in the pilot's compartment.

In the event that an erroneous installation is made of a 200° C. thermoswitch where a 750° C. thermoswitch is required, due to the similarity in appearance of the various thermoswitches or for some other reason, normal operation of the aircraft would very likely activate the fire detection system, indicating that safe operating temperatures had been exceeded, when in fact, a hazardous condition did not exist. Likewise, it is apparent that if a high temperature thermoswitch is used in a location calling for a lower temperature switch the warning to the pilot may be delayed. Since these several differently calibrated thermoswitches are usually mounted in a parallel circuit, heretofore there was no satisfactory way to determine which thermoswitch was improperly installed without removing and checking each one individually.

Additionally, it has been found that a thermoswitch is sometimes improperly calibrated by a manufacturer, or stamped with an incorrect identifying part number, thereby resulting in a situation analagous to that described in connection with the installation of an inappropriate thermoswitch. Therefore, inspection after installation is very desirable.

Similar problems are encountered in checking and inspecting the thermocouple type of heat sensing unit, and further, where such units are installed in the tail pipe of a jet aircraft, it has been common practice to check the thermocouple units by actually starting the jet engine and duplicating its flight operation. In this manner the thermocouple units are heated sufficiently to enable an approximate check of their operation after installation but this procedure is unsatisfactory for various reasons, such as that it requires the consumption of large quantities of fuel, and further additional personnel are needed to operate the jet engine while the checking of the thermocouple units is in progress.

Removing and checking each thermocouple unit for inspection using conventional laboratory equipment also is not satisfactory since this method does not provide an environmental check of the thermocouple unit nor a check of the circuit in which the unit is installed, but rather provides only a check of the unit under more or less ideal laboratory conditions.

Another method used in the prior art for checking thermoswitches and thermocouple units, subsequent to their installation in the aircraft, involved the application of heat to the particular heat sensing unit with a soldering iron or blowtorch. This method was ineffective to determine whether the units were functioning properly and at best only indicated whether the units were operative or completely inoperative.

It is, therefore, apparent that a testing device, preferably portable, is needed which will conveniently and speedily determine whether or not a heat sensing unit, or a plurality of such units, as for example, thermoswitches and thermocouple units, are functioning properly after such units have been installed in an aircraft. In addition, the testing device desirably should include a temperature measuring system, such as a thermocouple arrangement adapted for sensing with comparatively high accuracy the temperature of the heat sensing unit being tested whereby the temperature as sensed by the testing device may be compared with the temperature sensed by the heat sensing unit, in the case of a thermocouple unit, or the temperature at which the heat sensing unit actuates other apparatus, in the case of a thermoswitch.

It is, therefore, a primary object of the present invention to provide a novel device for substantially accurately determining whether or not a heat sensing unit is functioning properly.

It is another object of the invention to provide a portable device of unique construction for quickly and simply checking the accuracy of heat sensing units after they have ben installed in an aircraft circuit or the like.

It is still another object of the invention to provide an improved thermocouple system adapted for sensing and measuring temperature with a comparatively high degree of accuracy.

It is a further object of the invention to provide an unique device for comparatively easily determining if the proper heat sensing unit has been installed in a circuit.

It is another object of the invention to provide a testing device which may be adapted for testing either a thermoswitch or a thermocouple unit for proper operation.

Figure 2:
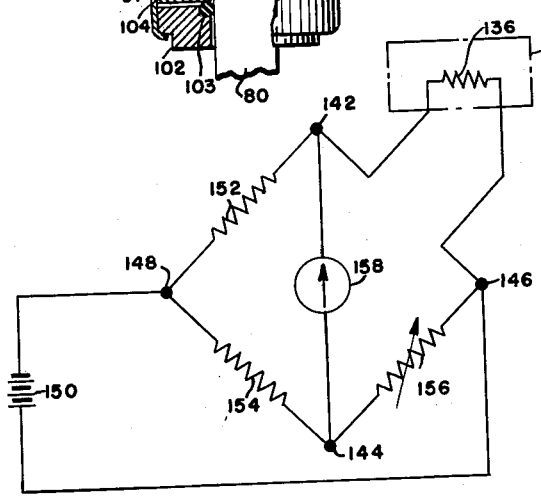

Other objects and features of the present invention will be readily apparent to those skilled in the art from the following specification and appended drawings, wherein is illustrated various forms of the invention, and in which:

FIGURE 1 is a side view, partly in section, of an embodiment of a testing device according to the present invention; and FIGURE 2 is a circuit for the embodiment of FIGURE 1.

It is to be understood that while FIGURE 1 shows only a portion of a complete unit, the latter is shown in the aforesaid application from which this application has been divided.

The testing device according to the present invention is adapted to convert power from a suitable power source into heat, and apply such heat in a measured degree to a heat sensing unit. The power supplied is variable and controlled by a conventional auto-transformer, in the case of alternating current, or by a conventional regulator, in the case of direct current, whereby a variable and controlled heat may be applied to the heat sensing unit by the testing device. Ordinarily a heat sensing unit, such as a thermoswitch or a thermocouple unit, is somewhat elongated and cylindrical in shape, and protrudes from the surface of the structure to which it is mounted. The testing device is, therefore, adapted to fit over and enclose the cylindrical main body of the unit whereby the unit may be heated by radiation and conduction from the testing device. It is to be understood, of course, that the testing device of the present invention is capable of adaptation to various sizes and shapes of heat sensing units, as will be seen.

A heating unit or element in the testing device serves to convert the power input from the variable power source into heat which is transferred to the heat sensing unit being tested by a heat conductive member or heat conductor associated with the heating element, the heat conductor substantially uniformly distributing the heat throughout that portion of the heat sensing unit which is in contact with the testing device.

The temperature of the heat sensing unit being tested is to be substantially accurately sensed by a temperature sensing device, such as a thermocouple, which is embodied in the testing device or an element the resistance of which varies with temperature, in combination with an externally located conventional potentiometer or other temperature indicating or measuring device, which desirably includes a direct reading dial calibrated in degrees of temperature on an appropriate scale, such as Fahrenheit or centigrade.

The aforesaid thermocouple type devices are claimed in the aforesaid parent application Serial No. 430,857, filed May 19, 1954, now Patent 2,854,844. The present application claims the type wherein an element is employed, the resistance of which varies with its temperature.

It will be apparent that the temperature indicated by the thermocouple arrangement of the present invention may be readily compared with the indications and operation of heat sensing units being tested whereby a check can be had on the operability and accuracy of such units.

For ease of explanation, the description hereinafter made will be concerned with an embodiment of the present invention which is particularly adapted by its construction for the testing of thermoswitch and thermocouple heat sensing units, respectively, which are located in an airplane vehicle employing a jet reaction propulsion unit. Although the invention is described with particular reference to such heat sensing units, it is to be understood that the features of the invention also make it adaptable to modification for use in connection with other installations, including similar heat sensing units associated with different types of vehicles and with vehicles employing propulsion units other than jet reaction propulsion units, as, for example, internal combustion engines.

The embodiment of the invention herein claimed is shown in FIGURE 1, for use in a circuit as shown in FIGURE 2. For extremely high temperatures whereat difficulty may be encountered in operation of the embedded thermocouple, it has been discovered that an element the resistance of which varies with temperature in a predetermined manner may be employed to sense the temperature of the tester.

Referring to FIGURE 1, structure is shown primarily in accordance with FIGURES 7-10 of Patent 2,854,844, although the principles thereof also apply equally to the structure of FIGURES 1-6 thereof. The thermocouple or thermoswitch tester is here generally designated 120. This may be of a right angle configuration, although only the portion for receiving the device to be tested is shown. Section 85 of a tubular enclosure or housing is illustrated with cooling apertures 91, nose collar 102, nose spacer 104 and triangular-shaped spring lock 103. Screw 100 is illustrated for maintaining certain parts, to be described, in relation to the tubular housing 85. The device to be tested, for example, a thermocouple, is designated by reference character 80. A heating winding 93 surrounds a heating member 122. Winding 93 will be connected by leads as in the embodiments previously described, to a source of variable power, all for raising the entire tester to a temperature to which the device 80 to be tested is to be subjected. Within the central bore 124 of heating member 122 is a heat conductor member 126. Heat conductor member 126 may be provided with a shoulder portion 128 at the lower end thereof, and a second shoulder portion 130 at the upper end thereof. Shoulder portions 128 and 130 are of such diameter as to snugly fit within the central bore 124 of the heating member 122. Between shoulder portions 128 and 130 there is a length 132 of reduced diameter. About this portion there may be wrapped a piece of insulating material 134, whereon may be wound an elongated conductor 136, which preferably is platinum, but may be any material the resistance of which varies in a known manner in relation to temperature. This conductor may be covered by or embedded in any suitable insulation to maintain the convolutions thereof electrically separated. A further layer of insulating material 138 may be wrapped about the wound resistance material. The complete assembly of heat conductor member 126 with the just-mentioned insulation and resistance member wound thereon, may be slidably inserted into the heating member 122 and the relationship maintained by set screw 100.

It will be understood that the structural features may vary from those as shown in FIGURE 1, without departing from the basic invention, which is to place a resistance element variable with temperature at such point as to sense the heat applied to the thermoswitch or thermocouple being tested.

The temperature-variable resistance 136 is diagrammatically illustrated in FIGURE 2 within the chain line 140, the latter being intended to represent the structure shown in FIGURE 1 and the equivalents thereof. Resistance element 136 is connected in a bridge circuit having terminals 142, 144, 146 and 148. A convenient source of power, such as battery 150, is connected across terminals 146 and 148. Resistor 152 is connected between terminals 142 and 148, and resistor 154 is connected between terminals 144 and 148. A variable resistor 156 is connected between terminals 144 and 146. Variable resistor 156 is to be a high quality calibrated resistor capable of fine adjustment.

A null point potential measuring instrument 158 is connected between terminals 142 and 144. It will now be apparent that instrument 158 will show a potential difference, of one polarity or another, depending upon whatever polarity difference may exist at any time between terminals 142 and 144 of the bridge circuit. Thus, assuming a given temperature for resistance element 136, adjustment of resistor 156 will bring the instrument 158 to a zero or null position. A scale (not shown) associated with resistance 156 may be directly calibrated in terms of degrees centigrade or degrees Fahrenheit, or whatever other standard is to be employed.

While a certain preferred embodiment of the invention has been specifically disclosed, it is understood that the invention is not limited thereto as many variations will be readily apparent to those skilled in the art and the invention is to be given its broadest possible interpretation within the terms of the following claim.

What is claimed is:

A device for testing a heat sensing unit, said device comprising a housing, an elongated heat conductive element disposed in said housing, said heat conductive element having a chamber formed therein with surfaces formed to receive said heat sensing unit therein, means comprising a first winding of electrical resistance wire wound about said heat conductive element and distributed along a substantial length thereof surrounding said chamber, a second winding wound about said heat conductive element between said first mentioned winding and said chamber and distributed along the length of the chamber, said second winding being of a material having a predetermined relationship between temperature and electrical resistance, and means for connecting said second winding to a means for determining the resistance thereof, the arrangement and therefore the temperature thereof, the arrangement being such that heat flow from the first winding through the heat conductive element to heat a unit in the chamber under test also heats the second winding thereby providing basis for comparison of the temperature indication of the unit under test and the second winding.

References Cited in the file of this patent

UNITED STATES PATENTS

| | | |
|---|---|---|
| 598,905 | Callendar | Feb. 15, 1898 |
| 2,162,614 | Fry et al. | June 13, 1939 |
| 2,570,781 | Duerr | Oct. 9, 1951 |
| 2,728,836 | De Boisblanc et al. | Dec. 27, 1955 |